United States Patent
Chu

(10) Patent No.: US 10,422,356 B2
(45) Date of Patent: Sep. 24, 2019

(54) APPARATUS AND CONTROL SYSTEM OF PROGRAMMABLE AIR SERVO MOTOR

(71) Applicant: CHINA PNEUMATIC CORPORATION, Taoyuan (TW)

(72) Inventor: Hsiu-Feng Chu, Taoyuan (TW)

(73) Assignee: CHINA PNEUMATIC CORPORATION (TW)

( * ) Notice: Subject to any disclaimer, the term of this patent is extended or adjusted under 35 U.S.C. 154(b) by 327 days.

(21) Appl. No.: 15/460,311

(22) Filed: Mar. 16, 2017

(65) Prior Publication Data

US 2017/0335866 A1    Nov. 23, 2017

(30) Foreign Application Priority Data

May 19, 2016 (TW) .............................. 105115496 A

(51) Int. Cl.
| | |
|---|---|
| *F15B 11/06* | (2006.01) |
| *B25B 23/145* | (2006.01) |
| *F15B 13/044* | (2006.01) |
| *F15B 15/26* | (2006.01) |
| *F15B 21/02* | (2006.01) |
| *G05B 9/02* | (2006.01) |

(52) U.S. Cl.
CPC ............ *F15B 11/06* (2013.01); *F15B 13/044* (2013.01); *F15B 15/262* (2013.01); *F15B 21/02* (2013.01); *G05B 9/02* (2013.01); *B25B 23/1456* (2013.01); *F15B 2211/633* (2013.01); *F15B 2211/6336* (2013.01)

(58) Field of Classification Search
CPC ....... B25B 23/1456; F15B 11/06; F15B 21/02
See application file for complete search history.

(56) References Cited

U.S. PATENT DOCUMENTS

| | | | | |
|---|---|---|---|---|
| 5,689,434 | A | * 11/1997 | Tambini .................. | B25B 23/14 700/282 |
| 2002/0035876 | A1 | * 3/2002 | Donaldson, Jr. .... | B25B 23/1453 73/862.21 |

* cited by examiner

*Primary Examiner* — Thomas E Lazo
*Assistant Examiner* — Michael Quandt
(74) *Attorney, Agent, or Firm* — Schmeiser, Olsen & Watts, LLP

(57) ABSTRACT

An apparatus and control system of a programmable air servo motor includes an air servo motor and an air servo motor driver, which are bi-directionally communicable with each other via communication units. The air servo motor includes an air motor, a sensor module, and a brake module that is normally locked and can be unlocked or locked by the air servo motor driver. The air servo motor driver includes a control module, an actuation module and a communication module. After actuating the air servo motor, the air servo motor driver receives torque, rotational speed and angle signals output by the sensor module. The actuation module drives the air servo motor to stop emergently, switch between forward and reverse rotation, increase or reduce rotational speed, operate at a specific angle, move by inching and operate at controlled torque similar to an electric servo motor without the need of an encoder.

10 Claims, 2 Drawing Sheets

APPARATUS AND CONTROL SYSTEM OF PROGRAMMABLE AIR SERVO MOTOR

CROSS-REFERENCE TO RELATED APPLICATION

This non-provisional application claims priority under 35 U.S.C. § 119(a) on Patent Application No(s). 105115496 filed in Taiwan, R.O.C. on May 19, 2016, the entire contents of which are hereby incorporated by reference.

FIELD OF THE INVENTION

The present invention relates to an apparatus and control system of a programmable air servo motor, and more particularly, to an air motor that has the same functions and features as an electric servo motor to stop emergently, switch between forward and reverse rotation, increase or reduce rotational speed, operate at a specific angle, move by inching and operate at controlled torque without the need of an encoder.

BACKGROUND OF THE INVENTION

Presently, an electric servo motor or a brushless motor is used to control the torque, rotational speed and angle of an electric tool or apparatus. Torque, rotational speed and angle signals from the electric tool or apparatus are detected and fed back by an encoder to an electric servo motor driver for signal analysis; and then based on the analytical results, required control formulas are encoded using mathematical programs for controlling the torque, rotational speed and angle of the electric tool or apparatus. However, in the current air tool industry, there is not any air motor with similar servo functions.

Generally, the use of an air motor is mainly based on a consideration of the working environment. The air motor are widely applied to petroleum and chemical plants, places with high concentration of dust, mineshafts, offshore oil platforms, sewers and damp environments because of the following unique advantages of the air motor: (1) no temperature rise at overload, no spark during operation, and no shock and short circuit risks; and (2) compact and light, and having higher output torque compared to an electric motor of similar volume. However, the air motor has the following disadvantages: (1) uneasy to control because air is compressible, highly frictional, tending to leak out and nonlinear; (2) not precisely controllable in its operational movements because the air motor does not stop immediately due to residual air pressure in the air supply line after the air supply is cut off; and (3) not controllable with an encoder because of its very high rotational speed of at least 6000 rpm or even more than 10000 rpm. Presently, all types of air motors have difficulty in rotational speed, rotational angle and torque controls, and are allowed only for simple switch between forward and reverse rotation. In view that there are quite many working environments in which electric servo motor is not suitable for use, the demand for products related to air motor servo control is growing rapidly.

It is therefore desirable to develop an air servo motor that can stop emergently, switch between forward and reverse rotation, increase or reduce rotational speed, operate at a specific angle, move by inching and operate at controlled torque similar to an electric servo motor.

SUMMARY OF THE INVENTION

It is a primary object of the present invention to overcome the disadvantages of the prior art air motors by providing an air servo motor apparatus and control system to enable programmable control of different operational movements of an air servo motor, so that the air servo motor can stop emergently, switch between forward and reverse rotation, increase or reduce rotational speed, operate at a specific angle, move by inching and operate at controlled torque without the need of an encoder.

To achieve the above and other objects, the apparatus and control system of the programmable air servo motor according to the present invention includes an air servo motor and an air servo motor driver. The air servo motor includes an air motor having an output shaft; a brake module connected to the output shaft; and a sensor module connected to the output shaft and including a torque, rotational speed and angle sensor unit, a first central processing unit (CPU), a first communication unit, a first input/output unit, a memory unit, and a power supply unit. The torque, rotational speed and angle sensor unit is electrically connected to the first CPU for sensing an output end of an output shaft of the sensor module and accordingly, transmitting a torque signal, a rotational speed signal and an angle signal to the first central processing unit. The first communication unit is electrically connected to the first CPU for transmitting the torque signal, the rotational speed signal and the angle signal to a communication module of the air servo motor driver. The first input/output unit and the power supply unit are electrically connected to the first CPU. The air servo motor driver includes an actuation module, a control module and the communication module. The control module includes a second CPU. The communication module includes a second communication unit and a wired communication unit, both of which are electrically connected to the second CPU. The actuation module includes an air supply pressure monitoring module, an air pressure regulating module, a third air pressure sensor unit, a forward-reverse solenoid valve and a brake solenoid valve, all of which are electrically connected to the second CPU. The actuation module is connected to the air motor via a forward-rotation air supply line and a reverse-rotation air supply line, to the brake module via a brake air supply line, and to an air supply unit via an air supply line. The second communication unit receives the torque signal, the rotational speed signal and the angle signal and transfers the received signals to the second CPU for controlling the actuation module; and the wired communication unit is electrically connectable to an external controller to enable controlling of the actuation module via the external controller.

In the apparatus and control system of the programmable air servo motor of the present invention, the power supply unit is rechargeable via wired charging or wireless charging.

In the apparatus and control system of the programmable air servo motor of the present invention, the air servo motor driver includes a second input/output module and a power supply module, both of which are electrically connected to the second CPU. And, the power supply module is rechargeable via wired charging or wireless charging.

In the apparatus and control system of the programmable air servo motor of the present invention, the control module of the air servo motor driver includes a memory unit, an input unit, a display unit and a warning unit or any combination thereof, all of which are electrically connected to the second CPU.

In the apparatus and control system of the programmable air servo motor of the present invention, the third air pressure sensor unit of the actuation module of the air servo motor driver is connected to the forward-rotation air supply line and the reverse-rotation air supply line.

In the apparatus and control system of the programmable air servo motor of the present invention, the air supply pressure monitoring module of the actuation module of the air servo motor driver can be an air pressure limiting valve or a first air pressure sensor unit and is connected to the air supply line.

In the apparatus and control system of the programmable air servo motor of the present invention, the air pressure regulating module of the actuation module of the air servo motor driver includes a second air pressure sensor unit, an air pressure proportional control valve and an air pressure control valve.

In the apparatus and control system of the programmable air servo motor of the present invention, the second air pressure sensor of the air pressure regulating module is connected to the air pressure monitoring module and the air pressure proportional control valve, the air pressure proportional control valve is connected to the air pressure control valve, and the air pressure control valve is connected to the forward-reverse solenoid valve.

In the apparatus and control system of the programmable air servo motor of the present invention, the second CPU controls the air supply pressure monitoring module to directly supply air with the highest permissible air pressure to the brake module of the air servo motor for the purpose of quick brake and immediate stop. Alternatively, the second CPU controls the brake solenoid valve to make instant burst of ON and OFF for controlling the air supply to the brake module.

In the apparatus and control system of the programmable air servo motor of the present invention, the forward-reverse solenoid valve includes two mutually independent solenoid valves, namely, a forward solenoid valve and a reverse solenoid valve, to work in cooperation with the air pressure regulating module, enabling the second CPU to control the output torques of the air motor in forward rotation and in reverse rotation separately.

With the apparatus and control system of the programmable air servo motor of the present invention, the air motor can be driven to stop emergently, switch between forward and reverse rotation, increase or reduce rotational speed, operate at a specific angle, move by inching and operate at controlled torque similar to an electric servo motor without the need of an encoder.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and by referring to the accompanying drawings.

Figure 1:
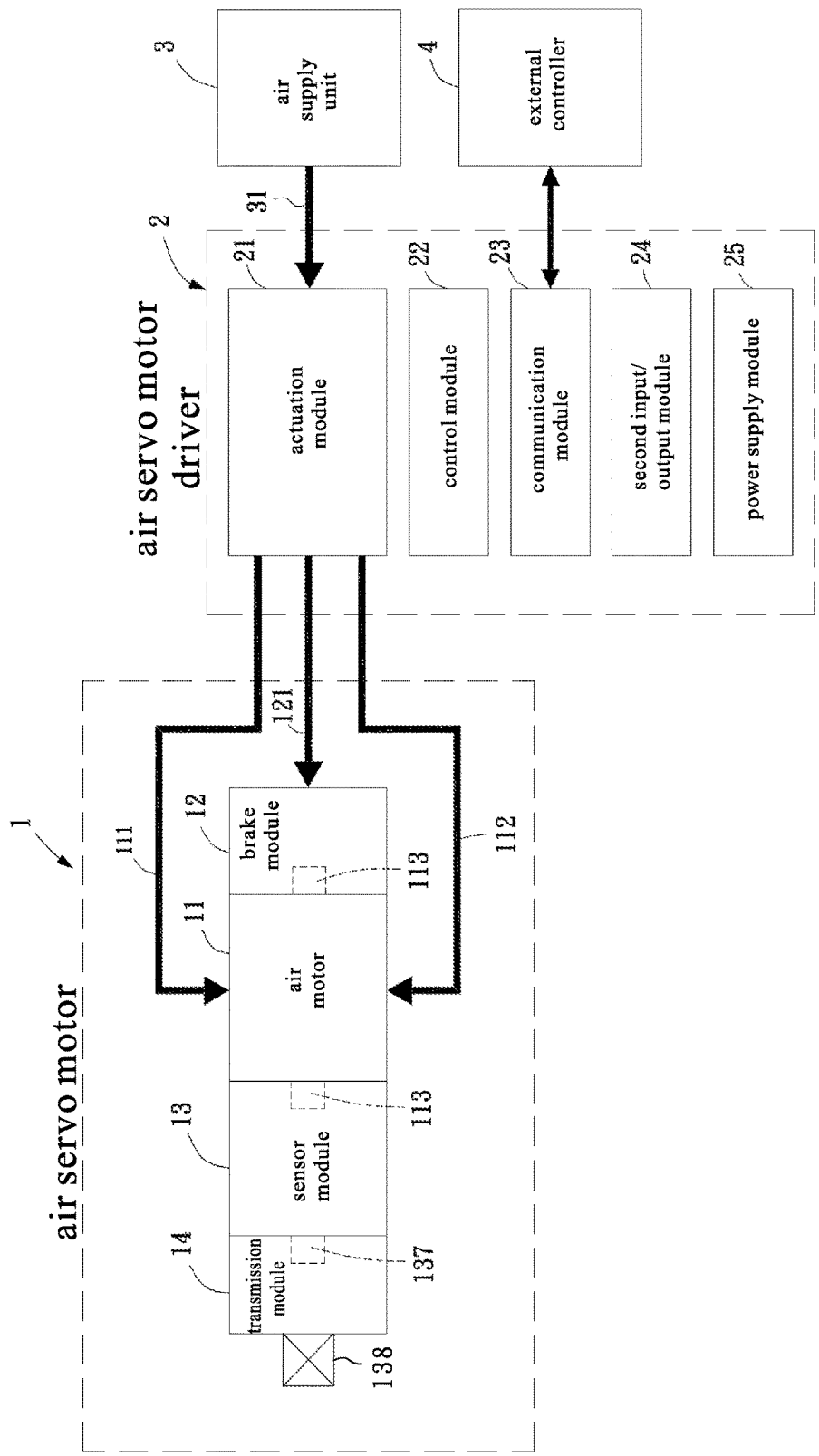
FIG. 1 is a schematic diagram showing an apparatus and control system of a programmable air servo motor according to a preferred embodiment of the present invention.
Figure 2:
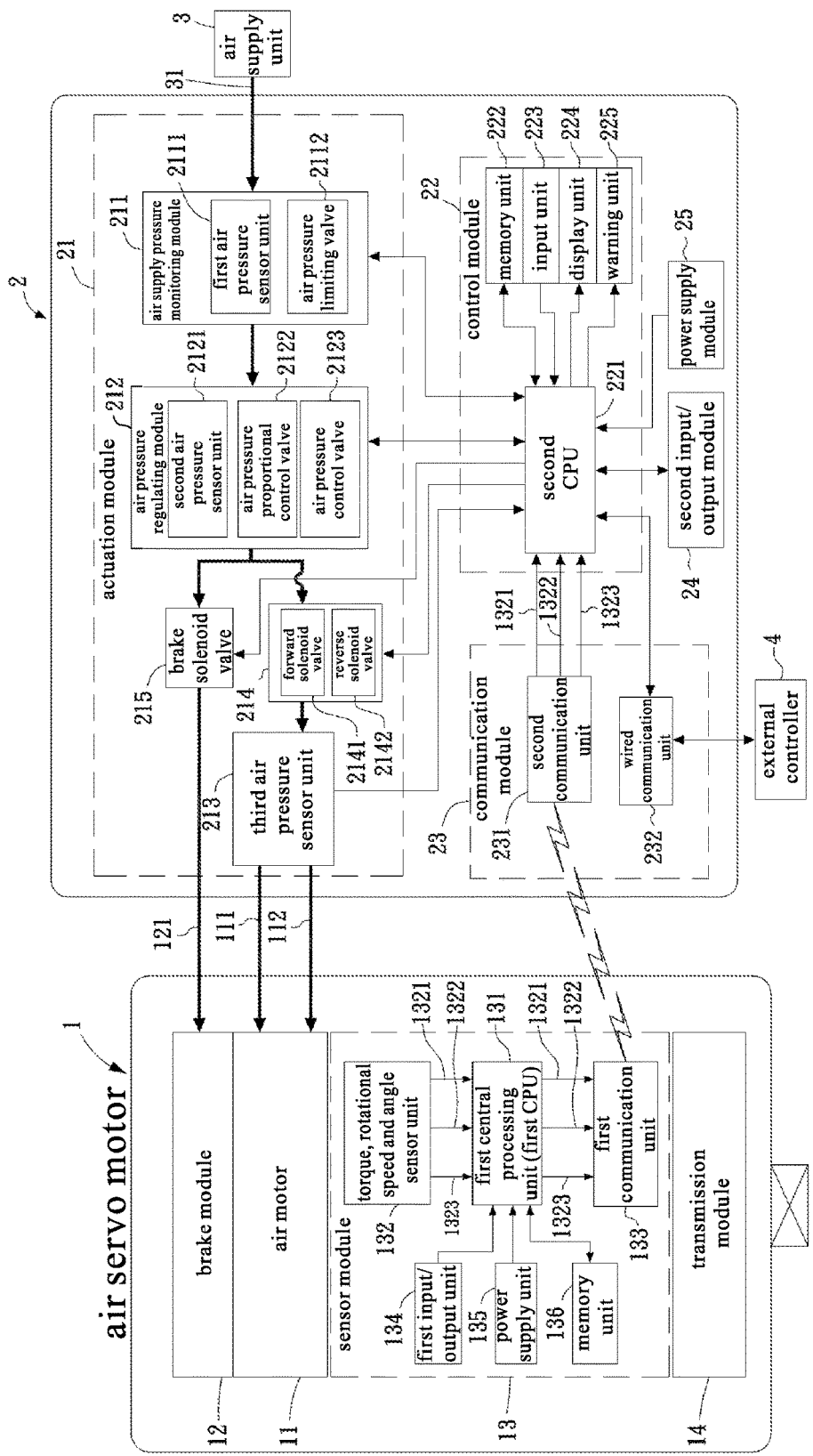
FIG. 2 is a schematic diagram showing the control flow of the apparatus and control system of the programmable air servo motor according to the present invention.

The present invention provides an apparatus and control system of a programmable air servo motor. Please refer to FIGS. 1 and 2. The apparatus and control system of the programmable air servo motor includes an air servo motor 1 and an air servo motor driver 2. FIG. 1 is the programmable air servo motor apparatus and FIG. 2 is the programmable air servo motor control system. The air servo motor 1 includes an air motor 11, a brake module 12, and a sensor module 13. The air motor 11 has an output shaft 113. The sensor module 13 is connected to a free end of the output shaft 113 of the air motor 11 and senses a torque, a rotational speed and a rotation angle from a transmission module 14 which is driven by an output shaft 137 of the sensor module 13. The brake module 12 is connected to another free end of output shaft 113 of the air motor 11 for stopping or rotating the output shaft 113. The brake module 12 can be mounted on a transmission shaft extended from an axis of the air motor 11, and can be a drum brake or a disk brake. The sensor module 13 includes a first central processing unit (CPU) 131; a torque, rotational speed and angle sensor unit 132; a first communication unit 133; a first input/output unit 134; a power supply unit 135 and a memory unit 136. The torque, rotational speed and angle sensor unit 132 is electrically connected to the first CPU 131 for transmitting a torque signal 1321, a rotational speed signal 1322 and an angle signal 1323 under the load from the transmission module 14 during operation. The torque, rotational speed and angle sensor unit 132 detects the torque signal 1321 via a strain gauge (not shown) or other torque sensing elements; and detects the rotational speed signal 1322 and the angle signal 1323 via a gyroscope (not shown) or other rotational speed sensing elements. The first CPU 131 can be a microprocessor and is electrically connected to the memory unit 136 to memorize the pre-calibrated torque signal 1321, the rotational speed signal 1322 and the angle signal 1323. The memory unit 136 can be, for example, a memory, a USB flash disk or a memory card. The first communication unit 133 is electrically connected to the first CPU 131 for transmitting the torque signal 1321, the rotational speed signal 1322 and the angle signal 1323 to a communication module 23 of the air servo motor driver 2. The first communication unit 133 can transmit data wirelessly by using Bluetooth, infrared, radio wave, Wi-Fi and the like. Alternatively, the first communication unit 133 can transmit data via wired communication using a slip ring or electrical rotary joint (not shown) along with the power supply unit 135. Further, the slip ring can also enables wired charging of the power supply unit 135. With the above arrangements, the output shaft 113 of the air motor 11 of the air servo motor 1 of the present invention can be emergently stopped via the brake module 12. Further, by using the brake module 12 along with the angle signal 1323 detected by the torque, rotational speed and angle sensor unit 132, it is possible to set the output shaft 113 of the air motor 11 of the air servo motor 1 to a specific angular position or cause inching movement of the air motor 11. Moreover, in the air servo motor 1 of the present invention, the torque signal 1321 detected by the torque, rotational speed and angle sensor unit 132 is used to control the output torque of an output shaft 138 of the transmission module 14 of the air servo motor 1.

Please refer to FIG. 2. In the air servo motor 1, the power supply unit 135 can be wirelessly charged to continuously supply power to the torque, rotational speed and angle sensor unit 132, the first CPU 131, the first communication unit 133, the first input/output unit 134 and the memory unit 136. Further, the power supply unit 135 can also be charged via wired charging.

Referring to FIGS. 1 and 2 again. The air servo motor driver 2 includes an actuation module 21, a control module 22 and the communication module 23. The control module 22 includes a second CPU 221, which can be a microprocessor. The communication module 23 is electrically connected to the second CPU 221, and includes a second communication unit 231 and a wired communication unit 232, which can be a USB port or other electrical connection ports. The actuation module 21 is electrically connected to the second CPU 221, and includes an air supply pressure monitoring module 211, an air pressure regulating module 212, a third air pressure sensor unit 213, a forward-reverse solenoid valve 214 and a brake solenoid valve 215. The actuation module 21 is connected to the air motor 11 via a forward-rotation air supply line 111 and a reverse-rotation air supply line 112, to the brake module 12 via a brake air supply line 121, and get an air supply unit 3 via an air supply line 31. The second communication unit 231 receives the torque signal 1321, the rotational speed signal 1322 and the angle signal 1323 from the first communication unit 133, and transfers the received signals to the second CPU 221 for controlling the actuation module 21. The second communication unit 231 can receive data via wireless communication using Bluetooth, infrared, radio wave, Wi-Fi and the like, or via wired communication. Further, the air servo motor driver 2 can also be electrically connected to an external controller 4, such as a personal computer or a programmable controller, via the wired communication unit 232 to control the actuation module 21. In this case, the second CPU 221 can assist the external controller 4 in controlling the actuation module 21 while linking to an external control system. With these arrangements, the brake module 12 of the air servo motor 1 can be controlled via the air servo motor driver 2, such that the output shaft 113 of the air motor 11 can be emergently stopped or reduced in rotational speed; and the air motor 11 can also have upgraded braking efficiency by controlling the air supply via the forward-rotation air supply line 111 or the reverse-rotation air supply line 112. Alternatively, the air supply pressure monitoring module 211 can be controlled by the second CPU 221 to directly supply air with the highest permissible air pressure to the brake module 12 for the purpose of quick brake and immediate stop; or alternatively, the second CPU 221 can control the air supply to the brake module 12 by controlling the brake solenoid valve 215 to make instant burst of ON and OFF control. Further, the air motor 11 of the air servo motor 1 can be controlled by the air servo motor driver 2 to rotate forwardly, reversely, with an increased speed, or a reduced speed. And, in the event the output torques of the air motor 11 in forward rotation and in reverse rotation must be separately controlled by the second CPU 221, the forward-reverse solenoid valve 214 can include two mutually independent solenoid valves, namely, a forward solenoid valve 2141 and a reverse solenoid valve 2142, to work in cooperation with the air pressure regulating module 212.

According to the above arrangements, the air servo motor 1 of the present invention can be emergently stopped, forwardly/reversely rotated, rotated at increased/reduced speed, operated at controlled torque and set to a specific angle without the need of an encoder. In addition, since the air servo motor 1 of the present invention can function as an electric servo motor, it can be more widely applied to servo control mechanisms and environment that require explosion protection and are often used in petroleum and chemical industrial equipment (for example, for chemical stirring tank control), explosion-proof ventilation fan control or mining equipment. Particularly, the air servo motor 1 of the present invention can be used in petroleum and chemical plants, places with high concentration of dust, mineshafts, offshore oil platforms and sewers to reduce the occurrence of industrial safety-related accidents. Further, the air servo motor 1 of the present invention may also be equipped with a reducer to form an advanced aerostatic wrench with the function of a servo motor. This type of advanced aerostatic wrench can be used to replace the conventional aerostatic wrench for more accurate torque control or even for other subsequently derived functions, such as controlling the tightening angle of a bolt after it has been attached to a bearing surface, so as to meet the standards of fastener safety set by the codes of different countries. Moreover, the apparatus and control system of the programmable air servo motor according to the present invention can be modularized for wide applications to various types of air motors to effectively upgrade their control accuracy and product value.

Please refer to FIGS. 1 and 2 again. The air servo motor driver 2 includes a second input/output module 24, such as a USB port or other electric connection ports, and a power supply module 25, such as a main electricity supply, both of which are electrically connected to the second CPU 221. Via the second input/output module 24, the air servo motor driver 2 can be connected to other external electronic devices for internal or external data transmission to expand its functions. The power supply module 25 can be charged via wired charging or wireless charging and supplies power to the air servo motor driver 2.

As shown in FIG. 2, in the air servo motor driver 2, the control module 22 includes a memory unit 222, an input unit 223, a display unit 224 and a warning unit 225, or any combination thereof, all of which are electrically connected to the second CPU 221. The memory unit 222 can be, for example, a memory, a USB flash disk or a memory card; the input unit 223 can be a keyboard or a touchscreen; the display unit 224 can be a liquid crystal display (LCD); and the warning unit 225 can be a warning light indicator or a warning horn. The warning unit 225 can warn a user of any abnormal condition of the air servo motor 1. The display unit 224 can display various data or messages. The input unit 223 allows a user to input different orders, such as brake, forward rotation, reverse rotation, increase speed, reduce speed, specific rotational speed, specific angle, inching, specific torque and the like. The memory unit 222 can memorize programs related to the control of, for example, the torque signal 1321, the rotational speed signal 1322 and the angle signal 1323.

As shown in FIG. 2, in the air servo motor driver 2, the air supply pressure monitoring module 211 is connected to the air pressure regulating module 212 and is connected to the air supply unit 3 via the air supply line 31. The air pressure monitoring module 211 includes a first air pressure sensor unit 2111 or an air pressure limiting valve 2112 for monitoring whether the air pressure supplied by the air supply unit 3 satisfies a normal value or not. In the event an abnormal air pressure value is detected, the air supply pressure monitoring module 211 can cause the second CPU 221 or the external controller 4 to control the forward-reverse solenoid valve 214 and the brake solenoid valve 215 to shut off or to control the warning unit 225 to emit warning light or warning sound. The air pressure regulating module 212 includes a second air pressure sensor unit 2121, an air pressure proportional control valve 2122 and an air pressure control valve 2123, which all are electrically connected to the second CPU 221. The second air pressure sensor unit 2121 can be an air pressure sensor and is connected to the air supply pressure monitoring module 211 and the air pressure proportional control valve 2122. The air pressure proportional control valve 2122 is connected to the air pressure control valve 2123. The air pressure control valve 2123 is connected to the forward-reverse solenoid valve 214 and the brake solenoid valve 215. Therefore, the air pressure proportional control valve 2122 can, based on instructions of the second CPU 221 and air pressure detected by the second air pressure sensor unit 2121, regulate the air pressure output by the air pressure control valve 2123 to the forward-reverse solenoid valve 214 and the brake solenoid valve 215 by proportioning the voltage or current input to the second CPU 221 and boosting or relieving the air pressure supplied by the air supply unit 3, so as to achieve the purpose of air pressure regulation. The second CPU 221 receives the torque signal 1321, the rotational speed signal 1322 and the angle signal 1323 detected by the sensor module 13 of the air servo motor 1, in order to obtain a real-time state of the air servo motor 1. Based on the real-time state, the second CPU 221 performs automatic regulation of the air supply pressure to enable more accurate control of the torque, rotational speed and angle. The air pressure regulating module 212 is connected to the forward-reverse solenoid valve 214 and the brake solenoid valve 215 for regulating the air pressure output by the forward-reverse solenoid valve 215 and the brake solenoid valve 215. The forward-reverse solenoid valve 214 is connected to the air motor 11 via the third air pressure sensor unit 213, the forward-rotation air supply line 111 and the reverse-rotation air supply line 112 for controlling the air motor 11 to rotate forwardly or to rotate reversely. The brake solenoid valve 215 is connected to the brake module 12 via the brake air supply line 121 for controlling the output shaft 113 of the air motor 11 to stop emergently or to rotate at reduced speed. Therefore, in the air servo motor 1 of the present invention, it is possible to correctly control the rotational speed, torque, rotational direction and angle of the output shaft 113 of the air motor 11 or to stop the rotation of the output shaft 113 of the air motor 11 via the actuation module 21 and the control module 22 or the external controller 4.

Referring to FIG. 2. In the air servo motor driver 2, the third air pressure sensor unit 213 is connected to the forward-rotation air supply line 111 and the reverse-rotation air supply line 112. The third air pressure sensor unit 213 can be an air pressure sensor. With these arrangements, the third air pressure sensor unit 213 can detect whether the air pressure input to the air motor 11 of the air servo motor 1 of the present invention is within an allowable range or not.

As can be seen in FIG. 2, in the air servo motor driver 2, the air supply pressure monitoring module 211 can be a first air pressure sensor unit 2111 or an air pressure limiting valve 2112 for monitoring whether the air pressure supplied by the air supply unit 3 satisfies a predetermined normal value or not. The first air pressure sensor unit 2111 can be an air pressure sensor. The air pressure regulating module 212 may include a second air pressure sensor unit 2121, an air pressure proportional control valve 2122 and an air pressure control valve 2123, which all are electrically connected to the second CPU 221. The second air pressure sensor unit 2121 can be an air pressure sensor and is connected to the air supply pressure monitoring module 211 and the air pressure proportional control valve 2122. The air pressure proportional control valve 2122 is connected to the air pressure control valve 2123. The air pressure control valve 2123 is connected to the forward-reverse solenoid valve 214 and the brake solenoid valve 215. Therefore, the air pressure proportional control valve 2122 can, based on instructions of the second CPU 221 and air pressure detected by the second air pressure sensor unit 2121, regulate the air pressure output by the air pressure control valve 2123 to the forward-reverse solenoid valve 214 and the brake solenoid valve 215 by proportioning the voltage or current input to the second CPU 221 and boosting or relieving the air pressure supplied by the air supply unit 3, so as to achieve the purpose of stabilization of the air pressure. The second CPU 221 receives the torque signal 1321, the rotational speed signal 1322 and the angle signal 1323 detected by the sensor module 13 of the air servo motor 1, to obtain a real-time state of the motion of the air servo motor 1. Based on the real-time state, the second CPU 221 performs automatic pressure regulation of the air supply pressure to achieve more accurate control of the torque, rotational speed and angle.

The present invention has been described with a preferred embodiment thereof and it is understood that the preferred embodiment is only illustrative and not intended to limit the present invention in any way and many changes and modifications in the described embodiment can be carried out without departing from the scope and the spirit of the invention that is intended to be limited only by the appended claims.

What is claimed is:

1. An apparatus and control system of a programmable air servo motor, comprising an air servo motor and an air servo motor driver;

the air servo motor including:
an air motor having an output shaft;
a brake module being connected to the output shaft; and
a sensor module being connected to the output shaft and including a torque, rotational speed and angle sensor unit, a first central processing unit (CPU), a first communication unit, a first input/output unit, a memory unit, and a power supply unit; the torque, rotational speed and angle sensor unit being electrically connected to the first CPU for sensing an output end of an output shaft of the sensor module and accordingly, transmitting a torque signal, a rotational speed signal and an angle signal to the first central processing unit; the first communication unit being electrically connected to the first CPU for transmitting the torque signal, the rotational speed signal and the angle signal to a communication module of the air servo motor driver; and the first input/output unit and the power supply unit being electrically connected to the first CPU;

the air servo motor driver including:
an actuation module, a control module and the communication module; the control module including a second CPU; the communication module including a second communication unit and a wired communication unit, both of which being electrically connected to the second CPU; the actuation module including an air supply pressure monitoring module, an air pressure regulating module, a third air pressure sensor unit, a forward-reverse solenoid valve and a brake solenoid valve, all of which being electrically connected to the second CPU; the actuation module being connected to the air motor via a forward-rotation air supply line and a reverse-rotation air supply line, to the brake module via a brake air supply line, and to an air supply unit via an air supply line; the second communication unit receiving the torque signal, the rotational speed signal and the angle signal from the first communication unit and the second communication transferring the received signals to the second CPU for controlling the actuation module; and the wired communication unit being electrically connectable to an external controller to enable controlling of the actuation module via the external controller.

2. The apparatus and control system of the programmable air servo motor as claimed in claim 1, wherein the power supply unit is rechargeable via wired charging or wireless charging.

3. The apparatus and control system of the programmable air servo motor as claimed in claim 1, wherein the air servo motor driver includes a second input/output module and a power supply module, both of which being electrically connected to the second CPU; and the power supply module being rechargeable via wired charging or wireless charging.

4. The apparatus and control system of the programmable air servo motor as claimed in claim 1, wherein the control module of the air servo motor driver includes a memory unit electrically connected to the second CPU, an input unit electrically connected to the second CPU, a display unit electrically connected to the second CPU and a warning unit electrically connected to the second CPU or any combination thereof, all of which being electrically connected to the second CPU.

5. The apparatus and control system of the programmable air servo motor as claimed in claim 1, wherein the third air pressure sensor unit of the actuation module of the air servo motor driver is connected to the forward-rotation air supply line and the reverse-rotation air supply line.

6. The apparatus and control system of the programmable air servo motor as claimed in claim 1, wherein the air supply pressure monitoring module of the actuation module of the air servo motor driver is an air pressure limiting valve or a first air pressure sensor unit and is connected to the air supply line.

7. The apparatus and control system of the programmable air servo motor as claimed in claim 1, wherein the air pressure regulating module of the actuation module of the air servo motor driver includes a second air pressure sensor unit, an air pressure proportional control valve and an air pressure control valve.

8. The apparatus and control system of the programmable air servo motor as claimed in claim 7, wherein the second air pressure sensor unit of the air pressure regulating module is connected to the air supply pressure monitoring module and the air pressure proportional control valve, the air pressure proportional control valve is connected to the air pressure control valve, and the air pressure control valve is connected to the forward-reverse solenoid valve.

9. The apparatus and control system of the programmable air servo motor as claimed in claim 1, wherein the second CPU controls the air supply pressure monitoring module to directly supply air with a highest permissible air pressure to the brake module of the air servo motor for quick brake and immediate stop.

10. The apparatus and control system of the programmable air servo motor as claimed in claim 1, wherein the forward-reverse solenoid valve includes two mutually independent solenoid valves, namely, a forward solenoid valve and a reverse solenoid valve, to work in cooperation with the air pressure regulating module, enabling the second CPU to control the output torques of the air motor in forward rotation and in reverse rotation separately.

* * * * *